(12) United States Patent
Riedel

(10) Patent No.: US 12,483,097 B2
(45) Date of Patent: Nov. 25, 2025

(54) ANNULAR HEAT SINK, ELECTRIC MOTOR, AND DRIVE ARRANGEMENT WITH AN ANNULAR HEAT SINK

(71) Applicant: KUKA Deutschland Gmbh, Augsburg (DE)

(72) Inventor: Martin Riedel, Augsburg (DE)

(73) Assignee: KUKA Deutschland GmbH (DE)

( * ) Notice: Subject to any disclaimer, the term of this patent is extended or adjusted under 35 U.S.C. 154(b) by 207 days.

(21) Appl. No.: 18/291,262

(22) PCT Filed: Jul. 6, 2022

(86) PCT No.: PCT/EP2022/068717
§ 371 (c)(1),
(2) Date: Jan. 23, 2024

(87) PCT Pub. No.: WO2023/001556
PCT Pub. Date: Jan. 26, 2023

(65) Prior Publication Data
US 2024/0372442 A1 Nov. 7, 2024

(30) Foreign Application Priority Data
Jul. 23, 2021 (DE) .................... 10 2021 119 202.1

(51) Int. Cl.
*H02K 9/22* (2006.01)
*H02K 5/18* (2006.01)

(52) U.S. Cl.
CPC .............. *H02K 9/227* (2021.01); *H02K 5/18* (2013.01)

(58) Field of Classification Search
CPC ............ H02K 9/14; H02K 9/227; H02K 9/12; H02K 5/18
USPC ......................................................... 310/64
See application file for complete search history.

(56) References Cited

U.S. PATENT DOCUMENTS

| 4,244,098 | A | 1/1981 | Barcus |
| 8,080,909 | B2 | 12/2011 | Perkins et al. |

FOREIGN PATENT DOCUMENTS

| CN | 103580383 A | 2/2014 |
| CN | 107492969 A | 12/2017 |
| DE | 702994 A | 2/1941 |
| DE | 1126498 A | 3/1962 |
| DE | 7016699 U | 11/1970 |

(Continued)

OTHER PUBLICATIONS

German Patent Office; Search report in related German Patent Application No. 10 2021 119 202.1 dated Apr. 29, 2022; 8 pages.

(Continued)

*Primary Examiner* — Jose A Gonzalez Quinones
(74) *Attorney, Agent, or Firm* — Dorton & Willis, LLP

(57) ABSTRACT

An annular heat sink for fastening to an outer shell wall of a heat-emitting electric motor includes at least one guide wall portion which is arranged on the annular heat sink and covers portions of at least one flow duct, delimited laterally by peripheral cooling fins, from the outside, in such a way that an air flow which has entered into a flow duct in a first region of a side of the annular heat sink which faces the incoming air is deflected into a second region of a side of the annular heat sink which faces away from the incoming air. The heat sink may be used in an electric motor, which may in turn be used in a drive arrangement.

10 Claims, 6 Drawing Sheets

(56) References Cited

FOREIGN PATENT DOCUMENTS

| DE | 2150881 | A |   | 4/1973 |   |   |
|----|---------|---|---|--------|---|---|
| DE | 102005032970 | B3 |   | 9/2006 |   |   |
| DE | 102005060329 | A1 |   | 6/2007 |   |   |
| DE | 102015219951 | A1 |   | 4/2017 |   |   |
| DE | 102015118695 | A1 | * | 5/2017 | ............ | H02K 5/207 |
| JP | H09201000 | A |   | 7/1997 |   |   |
| JP | H11299174 | A |   | 10/1999 |   |   |
| JP | 2009131127 | A | * | 6/2009 |   |   |
| JP | 2013207971 | A | * | 10/2013 |   |   |
| WO | WO-2020214939 | A1 | * | 10/2020 | ............... | H02K 9/18 |

OTHER PUBLICATIONS

European Patent Office; Search Report in related International Patent Application No. PCT/EP2022/068717 dated Oct. 31, 2022; 4 pages.

* cited by examiner

ANNULAR HEAT SINK, ELECTRIC MOTOR, AND DRIVE ARRANGEMENT WITH AN ANNULAR HEAT SINK

CROSS-REFERENCE TO RELATED APPLICATIONS

This application is a national phase application under 35 U.S.C. § 371 of International Patent Application No. PCT/EP2022/068717, filed Jul. 6, 2022 (pending), which claims the benefit of priority to German Patent Application No. DE 10 2021 119 202.1, filed Jul. 23, 2021, the disclosures of which are incorporated by reference herein in their entirety.

TECHNICAL FIELD

The invention relates to an annular heat sink for fastening to an outer shell wall of a heat-emitting electric motor. The invention also relates to an electric motor having such an annular heat sink, and to a drive arrangement which comprises an electric motor with such an annular heat sink.

BACKGROUND

DE 10 2004 007 395 B4 describes a motor generator having a cover-integrated base plate which has a plurality of through-holes as cooling air passages which are arranged parallel to the radial direction. The base plate is screwed to the end face of a second housing component of the motor generator by means of screws.

SUMMARY

The object of the invention is to create an annular heat sink, in particular an electric motor with such an annular heat sink, and in particular a drive arrangement having such an annular heat sink, by means of which annular heat sink the heat dissipation from the electric motor is improved.

The object is achieved by an annular heat sink for fastening to an outer shell wall of a heat-emitting electric motor, comprising:
- a peripheral inner wall with a cross-sectional contour adapted to the shape of the outer shell wall of the electric motor, such that the annular heat sink can be pushed onto the outer shell wall of the electric motor in the axial direction,
- multiple peripheral cooling fins arranged on the annular heat sink running peripherally around its circumference and which extend radially outward, which peripheral cooling fins extend oriented parallel to one another at a distance from one another, so that in each case two directly adjacent peripheral cooling fins delimit a flow duct for radially and/or tangentially incoming air, and
- at least one guide wall portion which is arranged on the annular heat sink and covers portions of at least one flow duct, delimited laterally by the peripheral cooling fins, from the outside, in such a way that an air flow which has entered into the flow duct in a first region of a side of the annular heat sink which faces the incoming air is deflected into a second region of a side of the annular heat sink which faces away from the incoming air.

The annular heat sink can be designed either as a closed ring or as an open, i.e., slotted, ring. At least, however, the ring has to extend about the circumference of the outer shell wall of the motor by more than 180 degrees, so that after axial plugging of the annular heat sink onto the outer shell wall of the heat-emitting electric motor, the annular heat sink is fixed in a radially positively locking manner. For an axial fixing of the annular heat sink on the outer shell wall of the heat-emitting electric motor, a non-positive or frictional connection can be sufficient, for example through a resilient design of the annular heat sink. A resilient design of the annular heat sink can be achieved for example by an embodiment of the annular heat sink as a slotted ring. Due to the radially positive fixing and the axial plug-on capability, the annular heat sink can easily be retrofitted to a motor without the motor as such having to be structurally changed, such as for example by a redesign of the motor housing. By attaching an additional annular heat sink to an outer shell wall of a heat-emitting electric motor, such an already-existing motor can be upgraded with an annular heat sink in order to increase its heat dissipation capability. The annular heat sink is especially suitable to be flowed around by a cooling air flow which is radially supplied to the motor so that the air flows onto the motor perpendicular to its axial extension and in particular flows around the motor. The axial extension of the motor results from the axial alignment of the motor shaft of the motor.

The peripheral inner wall of the annular heat sink forms an inwardly pointing shell surface of the annular heat sink. With the peripheral inner wall, the annular heat sink rests at least largely or completely flush against the outer shell wall of the electric motor when the annular heat sink is plugged onto the motor. The heat transfer takes place via the contact surface of the peripheral inner wall of the annular heat sink with the outer shell wall of the electric motor in order to dissipate the heat generated in the motor to the annular heat sink. To improve the heat transfer, a heat-conducting paste can be interposed between the annular heat sink and the motor, i.e., between the peripheral inner wall of the annular heat sink and the outer shell wall of the electric motor. The peripheral inner wall of the annular heat sink does not necessarily have to be run completely around 360 degrees; rather, as already mentioned, the ring can extend only over an angle between 180 degrees and 360 degrees, so that the inner wall of the annular heat sink extends over only a portion of 360 degrees. The peripheral inner wall of the annular heat sink can optionally also be interrupted, for example when the annular heat sink is designed as a slotted ring, or the annular heat sink has inner indentations, window cutouts or recesses, despite being designed as a closed ring.

The cross-sectional contour of the annular heat sink adapted to the shape of the outer shell wall of the electric motor is to be understood to mean that the largest possible contact surface is achieved between the annular heat sink and the motor, i.e., between the peripheral inner wall of the annular heat sink and the outer shell wall of the electric motor. Nevertheless, the cross-sectional contour of the annular heat sink does not necessarily have to be identical to the cross-sectional contour of the motor. Rather, despite a cross-sectional contour that is largely adapted, i.e., as large as possible, between the annular heat sink and the motor, the cross-sectional contour of the annular heat sink can correspondingly deviate slightly from the cross-sectional contour of the motor. On the other hand, the cross-sectional contour of the annular heat sink can, if appropriate, be designed to be entirely identical to the cross-sectional contour of the motor.

In this respect, the annular heat sink is pushed in the axial direction onto the outer shell wall of the electric motor in a direction parallel to the axis of rotation of the motor shaft of the motor.

The radially outwardly extending peripheral cooling fins can be designed to be continuous over the entire circumference of the annular heat sink, or in the case of a design of the annular heat sink of less than 360 degrees, over a corresponding partial circumference. Alternatively, the peripheral cooling fins extending radially outwards can be designed to be interrupted over the entire circumference of the annular heat sink, or, in the case of a formation of the annular heat sink of less than 360 degrees, over a corresponding partial circumference, i.e., a peripheral cooling fin arranged in an axial height position can be formed by two or more partial peripheral cooling fins. The peripheral cooling fins arranged peripherally on the annular heat sink over its circumference are to be understood in this broad sense in the context of the present disclosure.

The peripheral cooling fins or the two or more partial peripheral cooling fins extend parallel to one another at a distance from one another, so that in each case two directly adjacent peripheral cooling fins or partial peripheral cooling fins delimit a flow duct for radially and/or tangentially incoming air. In the sense of partial peripheral cooling fins, the flow ducts delimited by them can also be referred to as flow partial ducts.

The guide wall portions cover at least one flow duct which is laterally delimited by the peripheral cooling fins in portions from the outside. By suitable design and suitable positioning on the annular heat sink, the guide wall portions can deflect an air flow that has entered the flow duct in a first region of a side of the annular heat sink facing the incoming air into a second region of a side of the annular heat sink facing away from the incoming air.

As already mentioned, the annular heat sink is in particular suitable to be flowed around by a cooling air flow which is radially supplied to the motor so that the air flows onto the motor perpendicular to its axial extension and in particular flows around the motor.

In addition to the direct heat transfer from the motor to the annular heat sink by heat conduction, there is a further function in the conveying or ensuring an air flow around the annular heat sink and thus around the motor that is as homogeneous as possible. This relates both to a flow completely around the motor, including on the side facing away from the air, and to an at least reasonably uniform flow through the cooling fin ducts, especially the flow ducts situated in the slipstream of the motor, i.e., the side of the motor facing away from the inflowing cooling air. In order to enable this, the annular heat sink has the additional guide wall portions which close the radial fins, i.e., the peripheral cooling fins, from the outside, and thus form closed ducts. In one embodiment, however, these guide wall portions can be open toward the motor side, or toward the inside, and can guide the air directly along the motor casing surface. An inwardly open duct—the open side is closed by the motor—can also be realized with a larger cross-section without having to adapt the outer diameter. The guide wall portions can be geometrically matched to the surrounding cooling fins and designed such that they open into individual cooling fin ducts in a targeted manner. By varying the number of openings and their heights, it is possible to influence the air flow and the air distribution around the motor in a targeted manner. The inlet of the guide wall portions can in particular be located on both sides next to the motor in the region of the motor center plane. Here the air comes together, for example from many cooling fin ducts upstream of the motor together, and cannot escape beyond the motor due to the peripheral cooling fins of the annular heat sink. Additional, optionally funnel-shaped guide elements at the inlet are optionally possible. In addition to a tangential or peripheral air guide, additional end wall cooling fins, i.e., top fins of the annular heat sink, can also be used on the rear side of the motor, i.e., on the end face for air guidance. The end wall cooling fins in particular have the function of directing the air flow, which runs over the motor at the end wall, into central cooling fin ducts, which tend to be flowed through more poorly without the end wall cooling fins. In modified embodiments, further guide elements can direct the air downward again in the central region after the motor.

For a highly effective flow around, the annular heat sink can be used together with the motor in particular in conjunction with a drive arrangement which comprises an active cooling device which has a heat sink with a niche in which the annular heat sink is positioned. In such a variant embodiment, the annular heat sink can in particular be specifically matched to the cooling body with the niche, as will be described In more detail below.

In addition to such an arrangement in a niche of a heat sink, however, it is also possible to operate the annular heat sink without an additional heat sink and niche, i.e., without operating a special cooling device, i.e., with the motor only, without a drive arrangement. In this case, the guide wall portions can be pulled significantly further around the motor. The running outlets can, for example, be situated in the region of the motor side facing away from the air—the inlets of the guide ducts are again located on both sides next to the motor—in the region of the motor center plane.

Through an arrangement of horizontally radially extending cooling fins, an interference-free tangential flowing around the motor body can be enabled, wherein the heat-emitting surface can for example be increased fivefold in the region of the motor side. In addition, the surface of the upper side or rear side of the motor is also provided with cooling fins, whereby the heat-emitting surface can again be increased twofold, for example.

A narrow connection—preferably a clamp connection of the casing surfaces—produces a large-area contact between the annular heat sink and the motor. In this case, the contact can take place both on the side surface and additionally on the rear side of the motor. For assembly and bracing, the ring can have elastic, or more elastic, regions which enable deformation and nestling. The heat transfer can be improved by using a heat-conducting paste between the motor and the annular heat sink.

The annular heat sink can thus be fitted tightly around the motor, preferably by clamping. The annular heat sink is thereby always constructed in a motor-specific manner and adapted to the motor geometry.

The annular heat sink can be made of a highly thermally conductive material, preferably a metal, preferably aluminum, and is preferably produced in one piece as a cast construction or by metal 3D printing. However, the annular heat sink can also be manufactured in two or more parts in a differential design. The latter enables a type of modular system with scalable base elements, for example a retaining ring, multiple radial cooling elements which have the peripheral cooling fins, and air guide elements which have the guide wall portions. This enables a simple and cost-effective modification or adaptation of the annular heat sink to different geometries of the motor.

In addition to cooling motors, the annular heat sink according to the invention can also be used for cooling other bodies, such as containers with hot fluids or the like.

The at least one guide wall portion can be releasably fastened to a peripheral cooling fin or to multiple peripheral cooling fins for a re-attachment, in such a way that an existing guide wall portion can be removed from its current location on the peripheral cooling fins and can be attached again to the peripheral cooling fins at a different location.

Each guide wall portion can have clamping portions for this purpose, which are designed to clamp the corresponding guide wall portion to one or two directly adjacent peripheral cooling fins. A corresponding guide wall portion can also be clamped between two directly adjacent peripheral cooling fins.

The at least one guide wall portion can be formed in one piece on the annular heat sink, manufactured by means of an adjustable mold insert in such a way that annular heat sinks with differently positioned guide wall portions can be manufactured by adjusting and/or remounting the mold insert.

In the case of a one-piece design of the at least one guide wall portion with a peripheral cooling fin or with two directly adjacent peripheral cooling fins, the annular heat sink can be produced for example by a casting method. In order to be able to produce annular heat sinks that realize different flow paths depending on the specific application, it can be provided that those molding tool inserts within a casting mold for producing cast annular heat sinks that form the guide wall portions are arranged on the casting mold so as to be adjustable or remountable. Thus, by adjusting or remounting the mold inserts with the same mold, annular heat sinks can be produced which have differently positioned guide wall portions or have a different number of guide wall portions or have differently designed guide wall portions.

The flow ducts delimited by the peripheral cooling fins can be designed to be open at least in portions toward the inner wall, so that the flow ducts are not delimited on the inner peripheral side by the inner wall of the annular heat sink, but rather, in a state in which the annular heat sink is fastened on a motor, the flow ducts are delimited at least in portions by the outer shell wall of the motor.

By omitting limiting walls of the flow ducts on the annular heat sink on the inner peripheral side, the cooling air flow can be guided directly along the outer shell wall of the motor. At the same time, with otherwise identical dimensions of the annular heat sink, the flow cross-section in the individual flow ducts can be increased in the case of omitted limiting walls. In addition, material and consequently weight on the annular heat sink can be saved due to the omitted limiting walls.

The annular heat sink can have at least one end wall portion on which multiple end wall cooling fins are arranged.

Due to end wall cooling fins, by means of the annular heat sink a cooling air flow can also be guided, i.e., conducted, as required along the rear end side of the motor, i.e., away from the drive stub of the motor shaft.

The end wall cooling fins can be designed to guide the air flow that has entered in the first region of the side of the annular heat sink facing the incoming air into the second region of the side of the annular heat sink facing away from the incoming air, wherein the end wall cooling fins, running obliquely or in an arc-shaped manner, concentrate the air flow that has entered over the width of the first region into a central portion of the second region.

In particular, instead of running radially, the end wall cooling fins can preferably or completely be guided transversely, i.e., in particular in an alignment analogous to a secant of a circle, over the end face of the motor. Multiple end wall cooling fins can extend over the end face oriented at least substantially parallel to one another.

The end wall cooling fins can have asymmetrical courses in a second surface half of the end wall portion compared to the courses of end wall cooling fins in a first surface half of the end wall portion. This means that the end wall cooling fins do not have to be designed to be mirror-symmetrical or identical with respect to a center line, but rather can be arranged to run differently. Based on a vertical center line, the end wall cooling fins in a left half can thus run differently than the end wall cooling fins in a right half of the end wall portion.

The end wall portion does not necessarily have to have a closed surface, but can for example have a window cutout or even two or more window cutouts. If, for example, a window cutout is formed in a central region of the end wall portion, for example in order to create space for a rear bulge or a rear projection on the motor, this bulge or the projection can protrude through the window cutout when the annular heat sink is clamped to the motor. Since, in the case of a radial impinging of the cooling air flow, the bulge or the projection of the motor can form a flow obstacle for the cooling air flow, the end wall cooling fins can run in such a way that a cooling air flow directed onto the bulge or the projection is guided around the bulge or the projection by means of the end wall cooling fins and, if necessary, is brought together again, at least partially or completely, behind the bulge or the projection.

The annular heat sink can be designed to be spring-elastic, in such a way that the annular heat sink can be clamped with its peripheral inner wall against an outer shell wall of a heat-emitting electric motor, in contact with the motor.

Alternatively or additionally, the annular heat sink can have screw flange portions on which clamping screws can be attached, in order to be able to clamp a slotted annular heat sink to the motor by tightening the clamping screws. Such clamping screws can be expedient in particular if the annular heat sink as such cannot exert a sufficiently high spring tension force on the motor, or the annular heat sink is made substantially not resilient at all.

The object is also achieved by an electric motor having a rotor having a motor shaft, a stator in which the rotor is arranged so as to be rotatable, and a motor housing having an outer shell wall, wherein an annular heat sink according to at least one of the described embodiments is arranged on the outer shell wall of the electric motor. The outer shell wall can be part of the motor housing. The stator can be fastened in the motor housing.

The object is moreover achieved by a drive arrangement, comprising a heat-emitting electric motor, an annular heat sink according to at least one of the described embodiments arranged on the electric motor, and a cooling device comprising at least one heat sink and at least one fan acting on the heat sink with air, wherein the heat sink has a niche into which the annular heat sink projects in the installed position of the electric motor on the drive arrangement, so that the air introduced by the fan into ducts of the heat sink enters the annular heat sink on one side and exits from the annular heat sink again on an at least substantially opposite side in order to re-enter the heat sink.

As already mentioned, the annular heat sink is in particular suitable to be flowed around by a cooling air flow which is radially supplied to the motor so that the air flows onto the motor perpendicular to its axial extension and in particular flows around the motor. By means of the heat sink of the cooling device, the cooling air flow can be brought into an inflow which is supplied radially to the motor, so that the air flows onto the motor perpendicular to its axial extension and in particular flows around the motor. The cooling device comprises at least one fan, so that forced convection on the heat sink and on the annular heat sink is achieved.

In addition to the direct heat transfer from the motor to the annular heat sink by heat conduction, there is a further function in the conveying or ensuring an air flow around the annular heat sink and thus around the motor that is as homogeneous as possible. This relates both to a flow completely around the motor, including on the side facing away from the air, and to an at least reasonably uniform flow through the cooling fin ducts, especially the flow ducts situated in the slipstream of the motor, i.e., the side of the motor facing away from the inflowing cooling air. In order to enable this, the annular heat sink has the additional guide wall portions which close the radial fins, i.e., the peripheral cooling fins, from the outside, and thus form closed ducts.

The peripheral cooling fins can have recesses on their peripheral outer edges which are aligned with one another in the axial direction in such a way that one or more channel-like undercuts are formed into which lamellae of the heat sink project in the arrangement in which the annular heat sink is inserted into the niche of the heat sink.

Alternatively or in addition to the recesses, two adjacent end wall cooling fins can each delimit a flow duct of the annular heat sink, wherein the flow ducts of the annular heat sink are aligned with and/or open into flow ducts of the heat sink in the arrangement in which the annular heat sink is inserted into the niche of the heat sink.

The end wall cooling fins can in particular be aligned with and/or open into the flow ducts of the heat sink in such a way that a cooling air flow coming from the heat sink is diverted within the niche, i.e., in the end wall portion of the annular heat sink, and, after flowing through the niche at the other end of the annular heat sink, is brought together, at least partially or completely, in a central region where the cooling air flow re-enters the heat sink after leaving the annular heat sink.

Specific embodiments of the invention are explained in more detail in the following descriptions with reference to the accompanying drawings. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
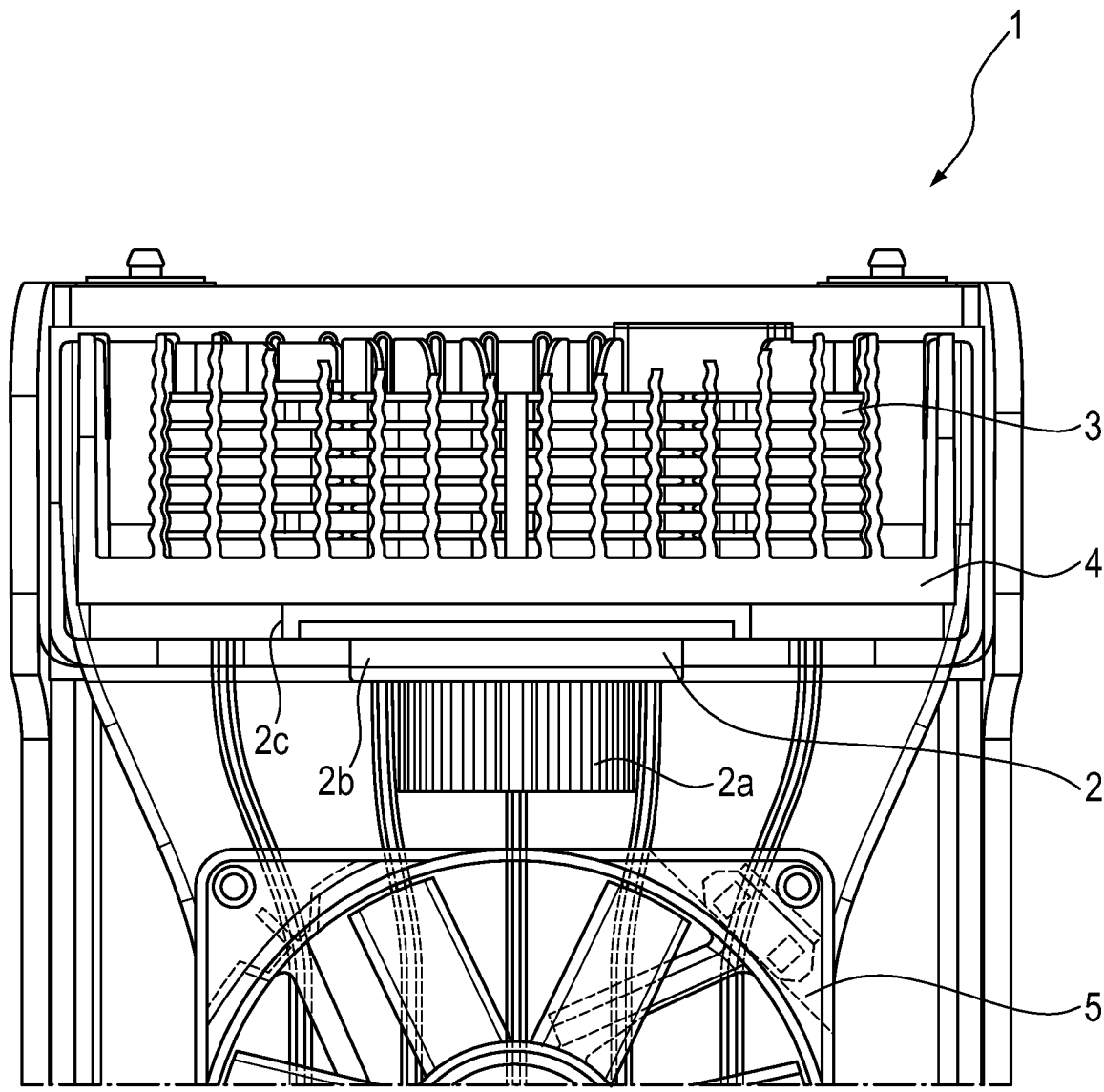
FIG. 1 shows a schematic representation of a drive arrangement having an electric motor and an exemplary annular heat sink according to the invention.
Figure 2:
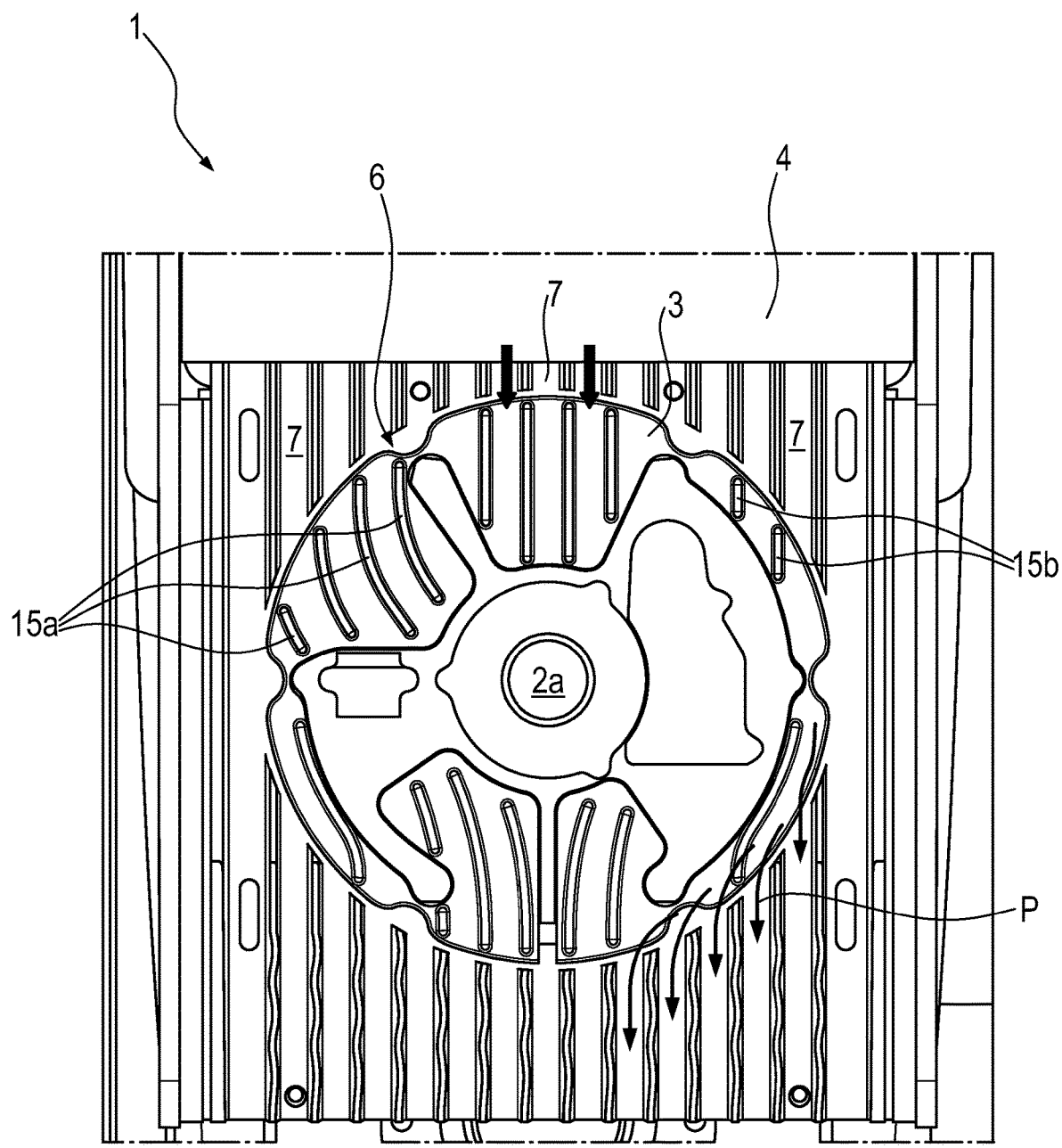
FIG. 2 shows a plan view of the heat sink of the drive arrangement with the annular heat sink inserted into the niche.
Figure 3:
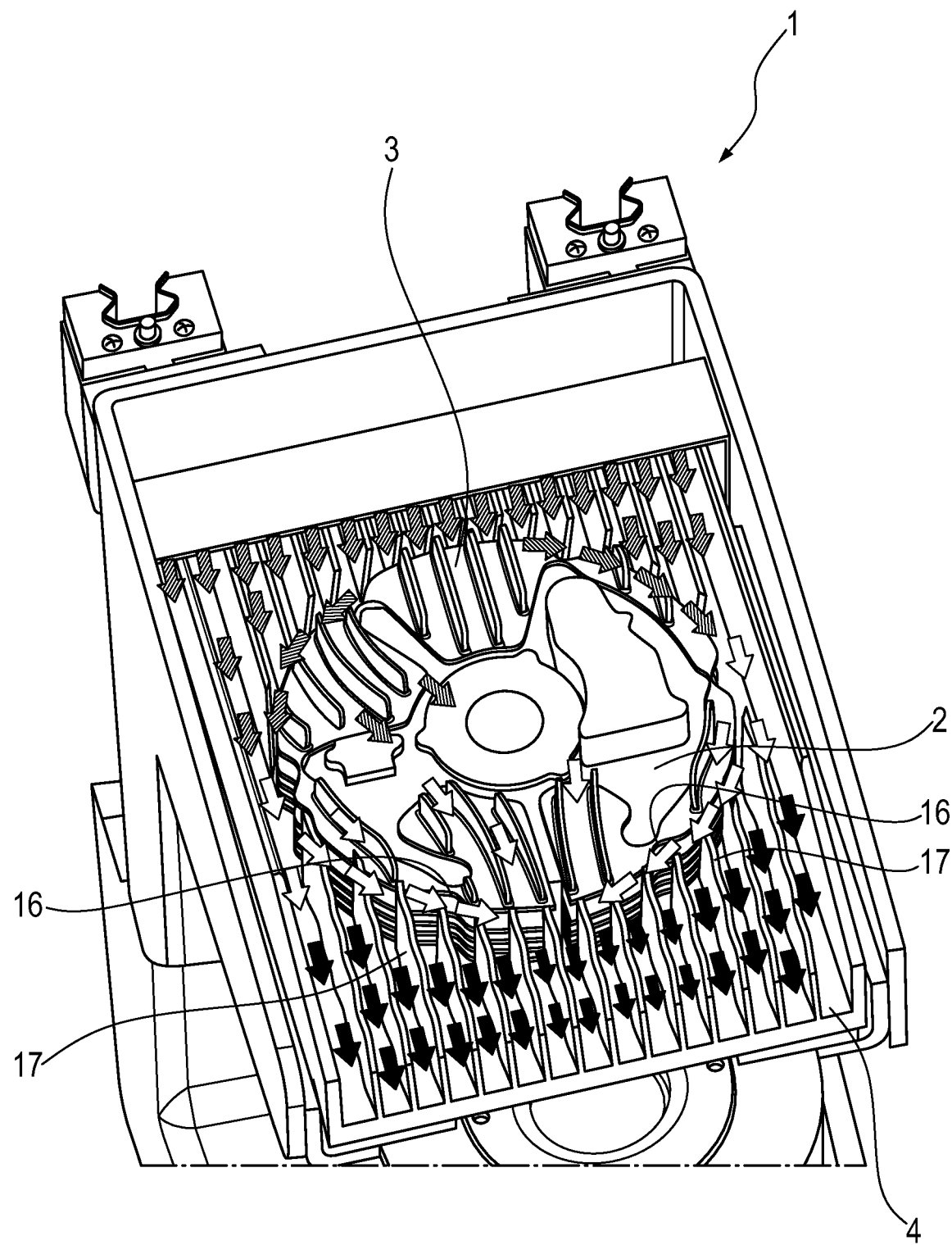
FIG. 3 shows a perspective view of the heat sink of the drive arrangement according to FIG. 2 with the annular heat sink inserted into the niche.
Figure 4:
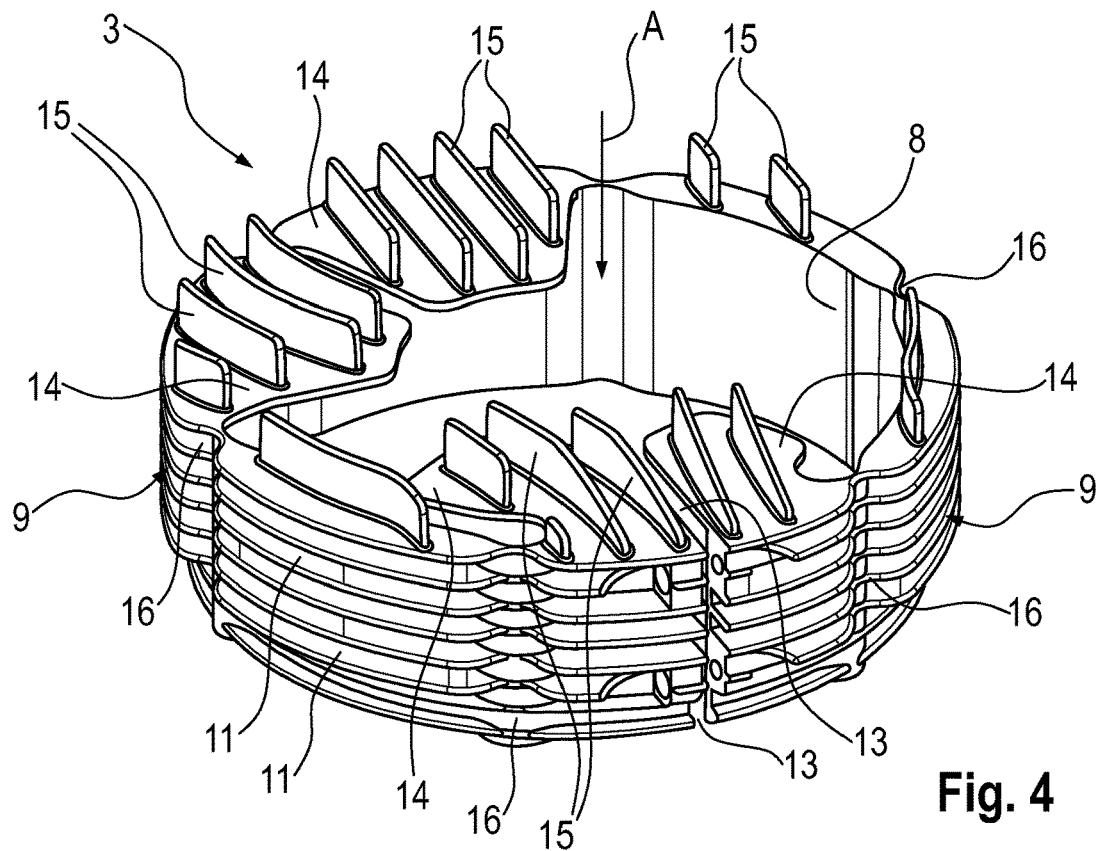
FIG. 4 shows a perspective view of the annular heat sink obliquely from above.

An exemplary embodiment of a drive arrangement 1 is shown in FIG. 1 to FIG. 3.

The drive arrangement 1 has a heat-emitting electric motor 2. A annular heat sink 3 according to the invention is arranged on the motor 2.

The electric motor 2 has a rotor with a motor shaft 2a, a stator 2b in which the rotor is rotatably arranged, and a motor housing with an outer shell wall 2c. The annular heat sink 3 according to the invention is plugged or clamped onto the outer shell wall 2c of the electric motor 2.

The drive arrangement 1 moreover has a cooling device which comprises at least one heat sink 4 and at least one fan 5 acting on the heat sink 4 with air.

The heat sink 4 has a niche 6 into which the annular heat sink 3 projects in the installed position of the electric motor 2 on the drive arrangement 1, so that the air introduced by the fan 5 into ducts 7 of the heat sink 4 enters the annular heat sink 3 at one side (for example at the top in FIG. 2) and exits the annular heat sink 3 again at an at least substantially opposite side (for example at the bottom in FIG. 2), in order to re-enter the heat sink 4, as shown by the arrows P in FIG. 2.

The annular heat sink 3 is shown in more detail by itself in each of FIG. 4 to FIG. 9.

The annular heat sink 3 has a peripheral inner wall 8 with a cross-sectional contour adapted to the shape of the outer shell wall 2c of the electric motor 2, such that the annular heat sink 3 can be pushed onto the outer shell wall 2c of the electric motor 2 in the axial direction A.

The annular heat sink 3 comprises multiple peripheral cooling fins 9 which are arranged peripherally over its circumference and extend radially outwards and which extend oriented parallel to one another at a distance from one another, so that in each case two directly adjacent peripheral cooling fins 9 delimit a flow duct 10 for radially and/or tangentially incoming air.

Figure 8:
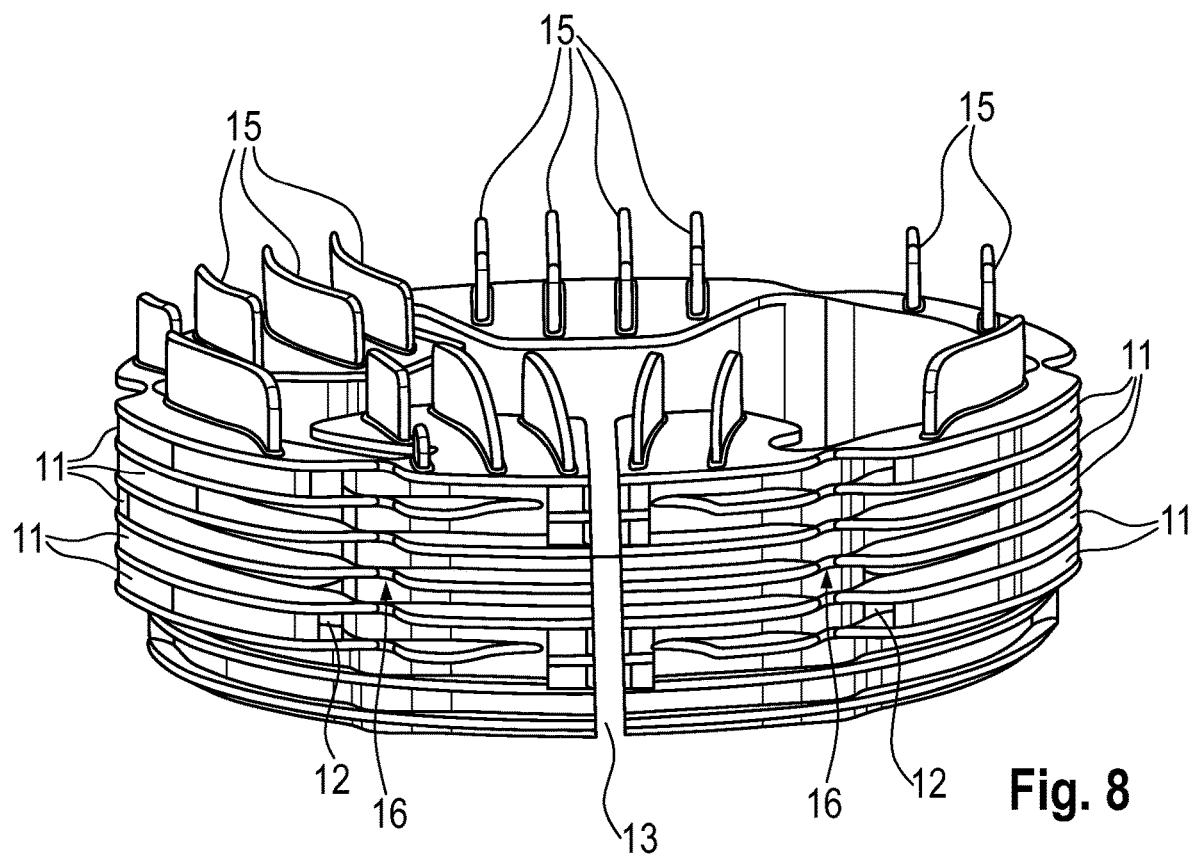
FIG. 8 shows a perspective view of the annular heat sink from a side facing away from the incoming air.
Figure 9:
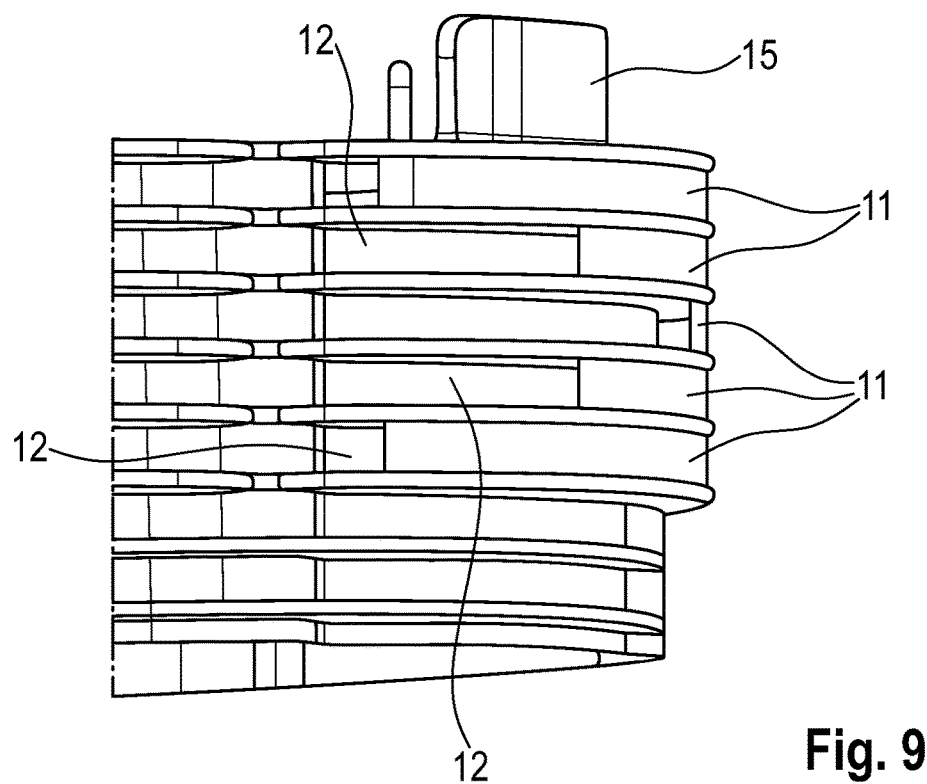
FIG. 9 shows an enlarged partial view of the annular heat sink according to FIG. 8 in the region of guide wall portions on a side facing away from the incoming air.

In the case of the present exemplary embodiment, the annular heat sink 3 comprises multiple guide wall portions 11 arranged on the annular heat sink 3, each of which covers at least one flow duct 10 laterally delimited by the circumferential cooling fins 9 in portions from the outside, such that an air flow entering the flow channel 10 in a first region of a side facing the incoming air (in FIG. 6 at the front) of the annular heat sink 3 is deflected into a second region of a side of the annular heat sink 3 facing away from the incoming air (at the front in FIG. 8).

The at least one guide wall portion 11 can either be detachably fastened to a peripheral cooling fin 9 or to multiple peripheral cooling fins 9 for a reattachment, in such a way that an existing guide wall portion 11 can be removed from its current location on the peripheral cooling fins 9 and can be reattached to the peripheral cooling fins 9 at another location, or the at least one guide wall portion 11 can be manufactured by means of an adjustable tool insert (not shown) in the case of a one-piece design on the annular heat sink 3, in such a way that annular heat sinks 3 with differently positioned guide wall portions 11 can be manufactured by adjusting and/or remounting the mold insert.

Figure 5:
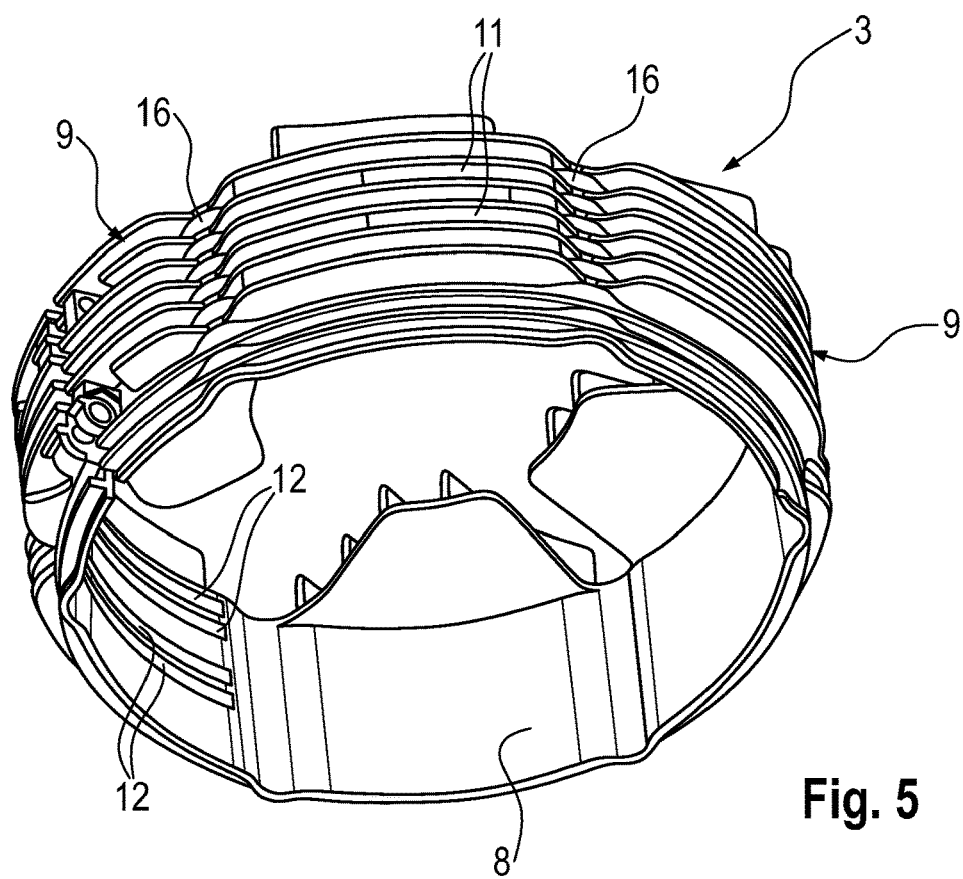
FIG. 5 shows a perspective view of the annular heat sink obliquely from below.
Figure 6:
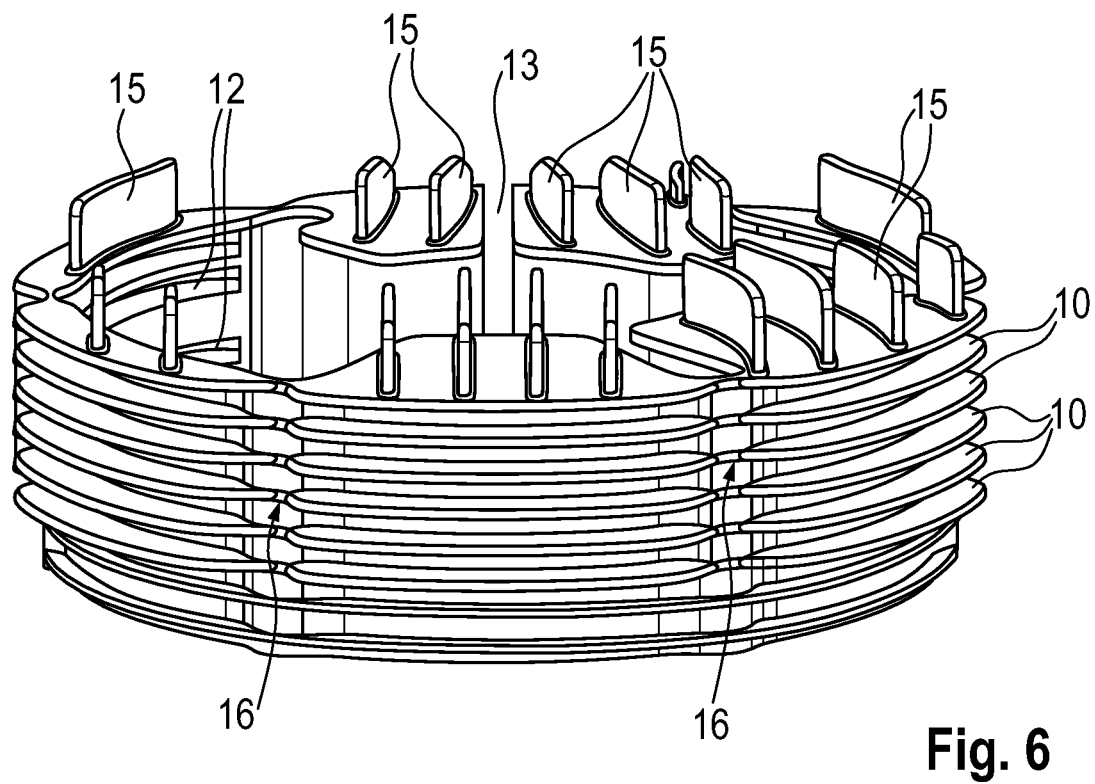
FIG. 6 shows a perspective view of the annular heat sink from a side facing the incoming air.
Figure 7:
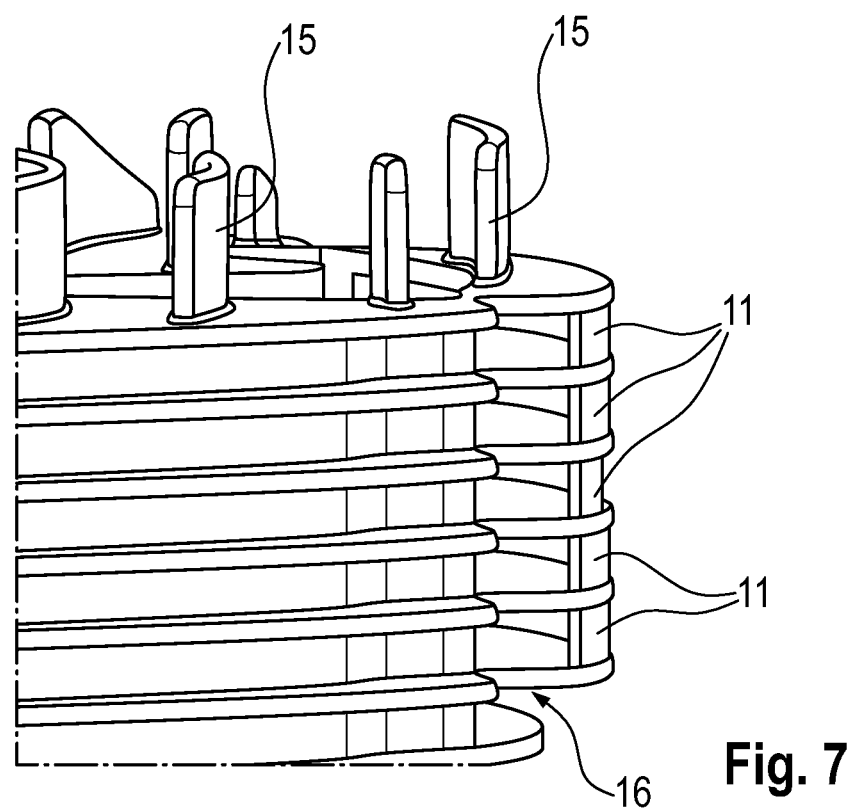
FIG. 7 shows an enlarged partial view of the annular heat sink according to FIG. 6 in the region of guide wall portions on a side facing the incoming air.

As can be seen in particular in FIG. 5, the flow ducts 10 delimited by the peripheral cooling fins 9 can be designed to be open at least in portions toward the inner wall 8, for example by the shown window cutouts 12, so that on the inner peripheral side the flow ducts 10 are not delimited by the inner wall 8 of the annular heat sink 3, but rather, in a state in which the annular heat sink 3 is fastened on a motor 2, the flow ducts 10 are delimited at least in portions by the outer shell wall 2c of the motor 2.

The annular heat sink 3 is designed to be spring-elastic in such a way that the annular heat sink 3 can be clamped with its peripheral inner wall 8 on an outer shell wall 2c of the heat-emitting electric motor 2, abutting the motor 2. For this purpose, the annular heat sink 3 can for example be made of a material having a high thermal conductivity and that has a certain material elasticity, such as aluminum. To improve the elastic behavior, the annular heat sink 3 can have a slot 13 which promotes an elastic widening of the annular heat sink 3.

In the case of the present embodiment, the annular heat sink 3 has multiple end wall portions 14 on which multiple end wall cooling fins 15 are arranged.

The end wall cooling fins 15 are designed to guide the air flow that has entered in the first region of the side of the annular heat sink 3 facing the incoming air (at the front in FIG. 6) into the second region of the side of the annular heat sink 3 facing away from the incoming air (at the front in FIG. 8), wherein the end wall cooling fins 15, running obliquely or in an arc-shaped manner, concentrate the air flow that has entered over the width of the first region into a central portion of the second region.

As can be seen in particular in FIG. 2, the end wall cooling fins 15 can have asymmetrical curves in a second surface half of the end wall portion 14, for example the left circular half in FIG. 2, compared to the courses of end wall cooling fins 15 in a first surface half of the end wall portion 14, for example the right circular half in FIG. 2. For example, as shown in FIG. 2, end wall cooling fins 15a shown on the left can be designed to run in an arc-shaped manner in a second surface half of the end wall portion 14, and the end wall cooling fins 15b shown on the right can be designed to run in a straight course in the first surface half of the end wall portion 14.

In the case of the present exemplary embodiment, the peripheral cooling fins 9 have recesses 16 on their peripheral outer edges, which recesses are aligned with one another in the axial direction in such a way that one or more channel-like undercuts are formed into which lamellae 17 of the heat sink 4 project in the arrangement in which the annular heat sink 3 is inserted into the niche 6 of the heat sink 4. This is shown in particular in FIG. 3, FIG. 4, and FIG. 5.

Two adjacent end wall cooling fins 15 each delimit a flow duct of the annular heat sink 3, wherein the flow ducts of the annular heat sink 3 are aligned with and/or open into flow ducts of the heat sink 4 in the arrangement in which the annular heat sink 3 is inserted into the niche 6 of the heat sink 4, as can be seen in particular in FIG. 2 and FIG. 3.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. An annular heat sink for fastening to an outer shell wall of a heat-emitting electric motor, the heat sink comprising:
    a peripheral inner wall having a cross-sectional contour adapted to the shape of the outer shell wall of the electric motor, such that the annular heat sink can be pushed onto the outer shell wall of the electric motor in an axial direction;
    a plurality of peripheral cooling fins arranged peripherally over a circumference of the annular heat sink and extending radially outwardly, the plurality of peripheral cooling fins oriented parallel to one another and spaced a distance apart from one another such that each two directly adjacent peripheral cooling fins delimit a corresponding flow duct for radially and/or tangentially incoming air; and
    at least one guide wall portion arranged on the annular heat sink and covering portions of at least one flow duct from the outside such that an air flow which has entered into the flow duct in a first region of a side of the annular heat sink that faces the incoming air is deflected into a second region of a side of the annular heat sink that faces away from the incoming air.

2. The annular heat sink of claim 1, wherein:
    the at least one guide wall portion is detachably fastened to one or more peripheral cooling fins for reattachment in such a way that an existing guide wall portion can be removed from its current position on the peripheral cooling fins and reattached at another position on the peripheral cooling fins; or
    the at least one guide wall portion is formed in one piece on the annular heat sink.

3. The annular heat sink of claim 1, wherein the flow ducts are open, at least in portions, toward the inner wall such that on the inner peripheral side, the flow ducts are not delimited by the inner wall of the annular heat sink, but, in a fastened state of the annular heat sink on a motor, the flow ducts are delimited at least in portions by the outer shell wall of the motor.

4. The annular heat sink of claim 1, further comprising:
    at least one end wall portion extending transverse to the peripheral inner wall; and
    a plurality of end wall cooling fins arranged on the at least one end wall.

5. The annular heat sink of claim 4, wherein:
    the end wall cooling fins are configured and arranged to guide air flow that has entered in the first region of the side of the annular heat sink that faces the incoming air into the second region of the side of the annular heat sink that faces away from the incoming air; and
    at least some of the end wall cooling fins extend obliquely or in an arc-shaped manner such that air flow that has entered over the width of the first region is concentrated the into a central portion of the second region.

6. The annular heat sink of claim 4, wherein end wall cooling fins arranged on a second surface half of the at least one end wall portion have asymmetrical courses compared to the courses of end wall cooling fins arranged on a first surface half of the at least one end wall portion.

7. The annular heat sink of claim 1, wherein the annular heat sink is configured to be spring-elastic, such that the annular heat sink can be clamped to a heat-emitting electric motor with the peripheral inner wall against an outer shell wall of the heat-emitting electric motor.

8. An electric motor assembly, comprising:
an electric motor comprising a rotor having a motor shaft, a stator in which the rotor is rotatably arranged, and a motor housing having an outer shell wall; and
an annular heat sink according to claim 1 arranged on the outer shell wall of the electric motor.

9. A drive arrangement, comprising:
a heat-emitting electric motor;
an annular heat sink according to claim 1 arranged on the electric motor; and
a cooling device comprising at least one additional heat sink and at least one fan acting on the additional heat sink with air;
wherein the additional heat sink has a niche into which the annular heat sink projects, such that air introduced by the fan into ducts of the additional heat sink enters the annular heat sink on one side, and exits from the annular heat sink on an at least substantially opposite side in order to reenter the additional heat sink.

10. The drive arrangement of claim 9, wherein at least one of:
the peripheral cooling fins have recesses on peripheral outer edges thereof, the recesses aligned with one another in the axial direction such that one or more channel-like undercuts are formed into which lamellae of the additional heat sink protrude; or
each two adjacent end wall cooling fins delimit an end wall flow duct of the annular heat sink, wherein the end wall flow ducts of the annular heat sink are at least one of aligned with flow ducts of the additional heat sink or open into the flow ducts of the additional heat sink.

\* \* \* \* \*